(12) United States Patent
Sakamoto et al.

(10) Patent No.: US 7,619,329 B2
(45) Date of Patent: Nov. 17, 2009

(54) PERMANENT MAGNET MEMBER FOR COIL MOTOR AND VOICE COIL MOTOR

(75) Inventors: Takeshi Sakamoto, Tokyo (JP); Tomomi Yamamoto, Tokyo (JP); Tatsuhiro Iwai, Tokyo (JP); Yasuyuki Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 387 days.

(21) Appl. No.: 10/551,803

(22) PCT Filed: Mar. 31, 2004

(86) PCT No.: PCT/JP2004/004615

§ 371 (c)(1),
(2), (4) Date: Feb. 22, 2006

(87) PCT Pub. No.: WO2004/098024

PCT Pub. Date: Nov. 11, 2004

(65) Prior Publication Data

US 2006/0202564 A1  Sep. 14, 2006

(30) Foreign Application Priority Data

Mar. 31, 2003  (JP) .............................. 2003-097395

(51) Int. Cl.
*H02K 41/02* (2006.01)

(52) U.S. Cl. .......................... 310/12; 310/85; 335/304

(58) Field of Classification Search ............. 310/12–13, 310/85; 360/266.9; 335/222, 302–306
See application file for complete search history.

(56) References Cited

U.S. PATENT DOCUMENTS

| 4,578,663 | A | * | 3/1986 | Sanders et al. | 335/306 |
| 4,810,986 | A | * | 3/1989 | Leupold | 335/301 |
| 5,329,267 | A | * | 7/1994 | Endoh et al. | 335/222 |
| 5,576,583 | A | * | 11/1996 | Umehara | 310/13 |
| 5,805,044 | A | * | 9/1998 | Leupold | 335/306 |

FOREIGN PATENT DOCUMENTS

| JP | A 05-284716 | 10/1993 |
| JP | A 11-140700 | 5/1999 |
| JP | A 2002-158105 | 5/2002 |

* cited by examiner

*Primary Examiner*—Michael C Zarroli
(74) *Attorney, Agent, or Firm*—Oliff & Berridge, PLC

(57) ABSTRACT

A magnet body 1 including a shorter periphery 11, a longer periphery 12 located at a position separated from the shorter periphery 11 by a predetermined distance, and a pair of side peripheries 13, 14 connecting the shorter periphery 11 and longer periphery 12 to each other, the magnet body having a fan-shaped planar form; and a corrosion-resistant film (Ni plating film 2) applied to a surface of the magnet body. The permanent magnet member 10 has a thickness whose maximum and minimum values yield a difference of 10 to 150 μm therebetween.

7 Claims, 6 Drawing Sheets

PERMANENT MAGNET MEMBER FOR COIL MOTOR AND VOICE COIL MOTOR

TECHNICAL FIELD

The present invention relates to a voice coil motor and a permanent magnet member for the voice coil motor.

BACKGROUND ART

Hard disk drives (hereinafter referred to as "HDD") in widespread use have a structure in which one or a plurality of magnetic disks arranged concentrically are driven by a spindle motor. Reading and writing of data in the HDD is carried out by a magnetic head disposed so as to oppose the magnetic disk. The magnetic head is driven by an actuator. As the actuator, a swing operation type voice coil motor (hereinafter referred to as "VCM") is used in general.

With reference to FIG. 7, a typical configuration and operation of the VCM will now be explained. As depicted, the VCM comprises a pair of yokes 15 disposed so as to oppose each other vertically, a permanent magnet member 10 disposed between the pair of yokes 15 and bonded to the lower yoke 15; and a head carriage 17, disposed so as to be rotatable about a shaft 18, having a fan-shaped coil 16 arranged in a magnetic gap formed between the upper yoke 15 and permanent magnet member 10.

When a predetermined current flows through the coil 16 in this VCM, a driving force occurs in any of directions of arrows A in the coil 16 in conformity to Fleming's left hand rule, whereby the head carriage 17 rotates about the shaft 18 in any of directions of arrows B. Because of such an action of the VCM, a magnetic head 19 mounted to the leading end part of the head carriage 17 moves in any of directions of arrows C which is opposite from the driving force generated in the coil 16. As a consequence, the magnetic head 19 can be positioned with respect to a magnetic disk 20.

Employed as the permanent magnet member 10 used in the VCM is an R-T-B type rare-earth permanent magnet material (wherein R is at least one kind of rare-earth element including Y, whereas T is at least one kind of transition metal element including Fe or Fe and Co as an essential ingredient), since it yields excellent magnetic characteristics. This rare-earth permanent magnetic material exhibits a low resistance to corrosion, since R and Fe, which are main constitutional elements thereof, are quite easy to oxidize. Therefore, when using this material as the permanent magnet member 10, the surface of a magnet body consisting of the permanent magnet material is usually coated with a corrosion-resistant film. For such a corrosion-resistant film, Ni or Ni alloy plating, which is excellent in resistance to corrosion, reliability, cleanliness, etc., is often employed. As the yokes 15, on the other hand, a silicon steel plate whose surface is provided with electroless Ni plating is often used.

Meanwhile, for responding to the recent speedup in information processing, HDDs employed as data storage means are required to be driven at a higher speed. This makes it necessary for the magnetic disk 20 to rotate at a high speed, which requires the VCM to be driven fast correspondingly thereto. In the conventional VCM, the permanent magnet member is used in the state secured to the yoke 15 as mentioned above typically by way of an adhesive layer. In order for the VCM to fully secure the durability at the time of high-speed driving, it is desirable that the permanent magnet member 10 and the yoke 15 be bonded firmly to each other.

Japanese Patent Application Laid-Open No. 2002-158105 discloses a method in which the surface of the Ni plating film in the permanent magnet member is phosphated with a processing solution having a specific composition. In this method, a phosphate coating having a desirable thickness is formed on the Ni plating film. The resulting magnet can effectively eliminate the poor hardening of an adhesive which is not reactive on the Ni plating film. This can reduce fluctuations in the bonding strength due to the adhesive, and can attain a bonding strength greater than that conventionally available. As a result, a higher efficiency can be achieved in the bonding operation.

DISCLOSURE OF THE INVENTION

Thus, the permanent magnet member conventionally made by phosphating the Ni plating film surface with a processing solution having a specific composition as mentioned above can improve the bonding strength when bonding the magnet with the adhesive. However, as the permanent magnet member, one which can exhibit excellent adhesion to yokes and the like when used in the VCM in particular has recently been in demand.

Therefore, it is an object of the present invention to provide a permanent magnet member for a VCM, which improves the adhesion to yokes by a technique different from the conventional technique mentioned above. It is another object of the present invention to provide a VCM equipped with such a permanent magnet member.

For achieving the above-mentioned objects, the inventors studied the relationship between the form of a bonding surface of a permanent magnet member for a VCM to a yoke and the bonding strength between the permanent magnet member and yoke. As a result, the inventors have found that excellent adhesion to the yoke can be obtained when the thickness of the permanent magnet member has maximum and minimum values yielding a difference therebetween falling within a predetermined range. This seems to be because a space useful for holding an adhesive for bonding the permanent magnet member for a VCM and the yoke together is formed at the bonding surface of the permanent magnet member to the yoke.

The present invention is based on the findings mentioned above and provides a permanent magnet member for a VCM, the permanent magnet member comprising a magnet body including a shorter periphery, a longer periphery located at a position separated from the shorter periphery by a predetermined distance, and a pair of side peripheries connecting the shorter and longer peripheries to each other, the magnet body having a fan-shaped planar form; and a corrosion-resistant film applied to a surface of the magnet body; wherein the permanent magnet member has a thickness whose maximum and minimum values yield a difference of 10 to 150 μm therebetween.

Thus, the permanent magnet member for a VCM has a thickness with maximum and minimum values. Therefore, the permanent magnet member for a VCM attains a space which can hold an adhesive on its bonding surface at the time when bonded to a yoke in the VCM by way of an adhesive layer. Consequently, when the permanent magnet member is bonded to the yoke, a greater amount of adhesive is interposed therebetween than in the conventional case where flat surfaces are bonded together. As a result, the permanent magnet member is firmly bonded to the yoke.

Preferably, the maximum and minimum values of the thickness exist in the following fashion in the permanent magnet member for a VCM. Namely, it is preferred that the maximum value of the thickness exist along a peripheral part comprising the shorter periphery, longer periphery, and side peripheries, and that the minimum value of the thickness exist in an area surrounded by the peripheral part.

In thus configured permanent magnet member for a VCM, a region extending along the peripheral part attains a form projecting from the area surrounded by the peripheral part. The permanent magnet member for a VCM having such a form can hold the adhesive in the space formed in the area surrounded by the peripheral part when bonded to the yoke. Therefore, a greater amount of adhesive can be held between the permanent magnet member and the yoke, whereby the bonding strength therebetween further improves.

The permanent magnet member for a VCM may have shapes formed by the following modes. First, it is preferred that the corrosion-resistant film have a thickness whose maximum value exists along a peripheral part constituted by the shorter periphery, longer periphery, and side peripheries, and whose minimum value exists in an area surrounded by the peripheral part. In other words, this mode can be considered a state where the corrosion-resistant film is thicker in the peripheral part than in other areas.

In this case, the magnet body may have a substantially uniform thickness or a thickness smaller in the peripheral part than in other areas. Even when the magnet body has such a form, the corrosion-resistant film is shaped as mentioned above, whereby the permanent magnet member for a VCM has such a form that the peripheral part thereof projects.

On the other hand, the magnet body may have a thickness greater in the peripheral part thereof than in other areas. Preferably, in this case, the corrosion-resistant film has a substantially uniform thickness. Such a permanent magnet member for a VCM also attains a form in which the peripheral part projects.

Preferably, the permanent magnet member for a VCM in accordance with the present invention has a thickness of 5 mm or less, whereas the corrosion-resistant film is constituted by an electric plating film made of Ni or an Ni alloy and has a thickness falling within the range of 5 to 60 μm. Thus configured permanent magnet member for a VCM can favorably be employed in typical VCMs and achieves high versatility.

In another aspect, the present invention provides a favorable VCM equipped with the permanent magnet member for a VCM in accordance with the present invention. Namely, the VCM in accordance with the present invention comprises a pair of yokes disposed so as to oppose each other with a predetermined distance therebetween, a permanent magnet member disposed between the pair of yokes and bonded to each of the yokes by way of an adhesive layer, and a coil mounted to a rotatable member and disposed in a magnetic space formed by the permanent magnet member and the yoke, the rotatable member being rotatable about a predetermined axis; wherein a bonding surface of the permanent magnet member to the yoke has a peripheral part projecting by 5 to 75 μm from an area surrounded by the peripheral part.

In thus configured VCM, the bonding surface of the permanent magnet member to a yoke has the form mentioned above, whereby a space is formed between the permanent magnet member and the yoke. The adhesive layer bonding the permanent magnet member and the yoke to each other is formed so as to fill this space. Therefore, a greater amount of adhesive is held between the permanent magnet member and yoke in thus configured VCM than in the conventional case where the permanent magnet member and yoke are bonded by flat surfaces. As a result, the VCM becomes one in which the permanent magnet member and yoke are firmly bonded together.

As mentioned above, the permanent magnet member for a VCM in accordance with the present invention has a predetermined space which can hold an adhesive on a surface to be bonded to a yoke. From such a viewpoint, the permanent magnet member for a VCM in accordance with the present invention may be a planar permanent magnet member, the permanent magnet member comprising a magnet body and a corrosion-resistant film formed on a surface of the magnet body, the permanent magnet member having first and second surfaces opposing each other, at least one of the first and second surfaces being formed with a recess, a deepest part in the recess and a tangent plane thereof have a distance of 5 to 75 μm therebetween.

At the part to be bonded to a yoke, the permanent magnet member for a VCM having such a shape can form a space similar to that in the case employing the above-mentioned permanent magnet member for a VCM.

Preferably, thus specified permanent magnet member for a VCM has a shape similar to that mentioned above. Namely, it is preferred that the permanent magnet member for a voice coil motor comprise a shorter periphery, a longer periphery located at a position separated from the shorter periphery by a predetermined distance, and a pair of side peripheries connecting the shorter and longer peripheries to each other, and have a fan-shaped planar form. More preferably, the first and second surfaces have a distance of 5 mm or less therebetween, and the corrosion-resistant film has a thickness of 5 to 60 μm.

BEST MODES FOR CARRYING OUT THE INVENTION

In the following, preferred embodiments of the present invention will be explained in detail with reference to the drawings. Here, constituents identical to each other will be referred to with numerals identical to each other without repeating their overlapping explanations.

The permanent magnet member for a VCM in accordance with an embodiment comprises a magnet body and an Ni or Ni alloy plating (which will collectively be referred to as "Ni plating") acting as a corrosion-resistant film provided so as to cover the surface of the magnet body.

Figure 1:
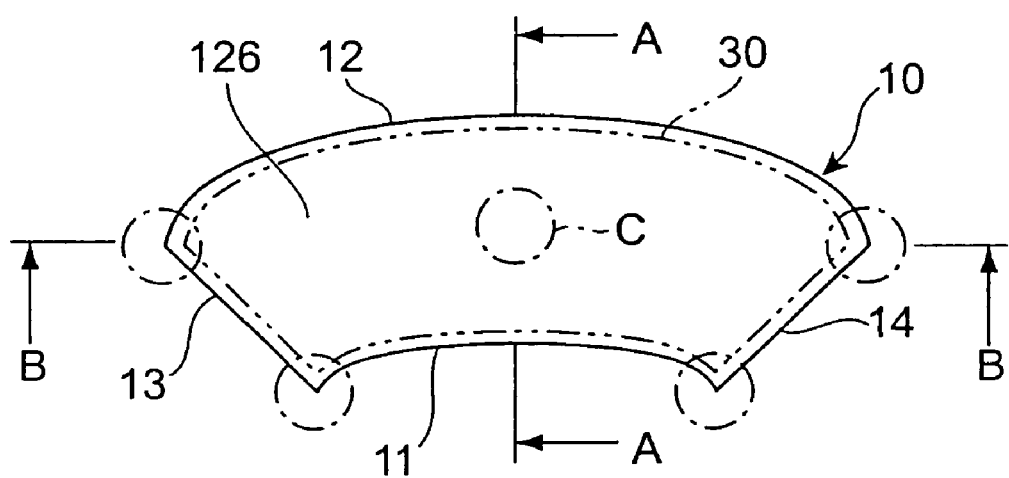
FIG. 1 is a plan view showing the permanent magnet member for a VCM in accordance with an embodiment.
Figure 2:
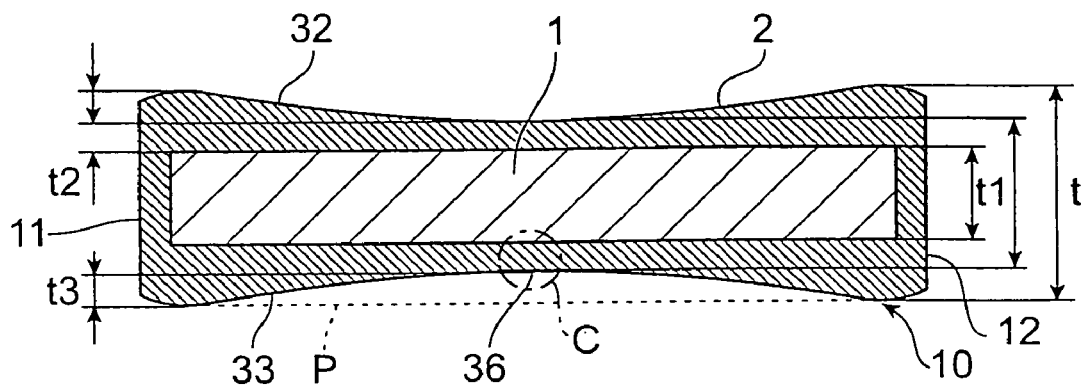
FIG. 2 is a view showing a first mode of the cross-sectional structure of the permanent magnet member taken along the line A-A of FIG. 1.
Figure 3:
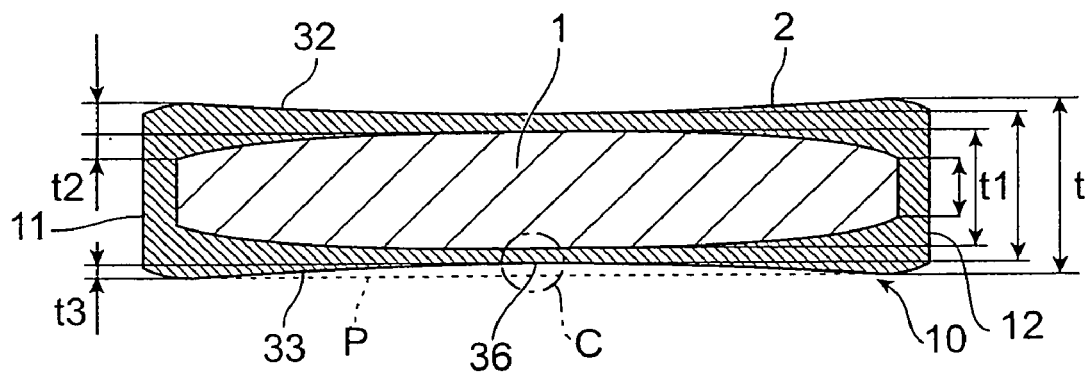
FIG. 3 is a view showing a second mode of the cross-sectional structure of the permanent magnet member taken along the line A-A of FIG. 1.
Figure 4:
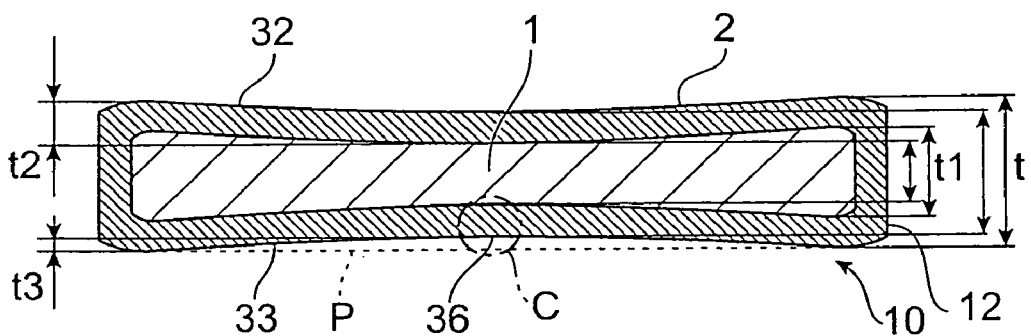
FIG. 4 is a view showing a third mode of the cross-sectional structure of the permanent magnet member taken along the line A-A of FIG. 1.
Figure 8:
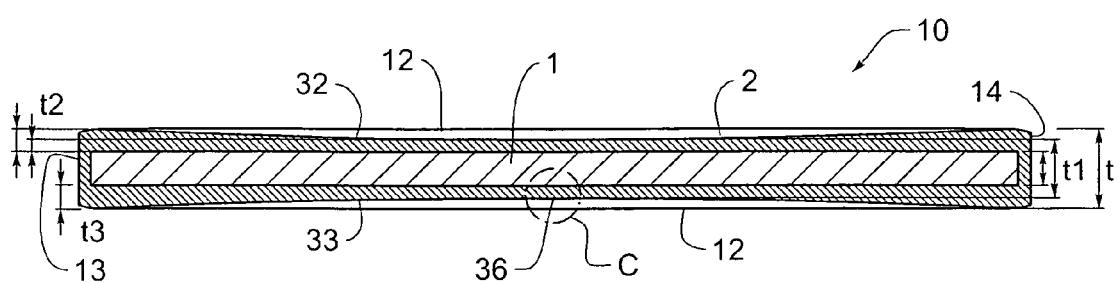
FIG. 8 is a view showing the cross-sectional structure of an embodiment of the permanent magnet member for a VCM taken along the line B-B of FIG. 1.

FIG. 1 is a plan view showing the permanent magnet member for a VCM in accordance with this embodiment. FIGS. 2 to 4 are views showing first to third modes of the cross-sectional structure of the permanent magnet member for a VCM taken along the line A-A of FIG. 1. FIG. 8 is a view showing an embodiment of the cross-sectional structure of the permanent magnet member for a VCM taken alone the line B-B of FIG. 1. The permanent magnet member 10 for a VCM comprises a shorter periphery 11, a longer periphery 12 opposing the shorter periphery 11 with a predetermined distance therebetween, and side peripheries 13 and 14 connecting the shorter periphery 11 and longer periphery 12 to each other. The permanent magnet member 10 has a planar form with an upper face 32 (first surface) and a bottom face 33 (second surface) which are located on the upper and lower sides of a peripheral part 30 constituted by the shorter periphery 11, longer periphery 12, and side peripheries 13, 14. This permanent magnet member 10 has a fan-shaped planar form.

Preferably, thus configured permanent magnet member 10 has a thickness of 5 mm or less. Here, the thickness of the permanent magnet member 10 refers to the distance between the upper face 32 and bottom face 33, and is represented by t in FIGS. 2 to 4 and 8. As depicted, the thickness t is the sum of the thickness t1 of the magnet body 1 and the thickness t2 of the Ni coating film 2 acting as the corrosion-resistant film. The thickness of the permanent magnet member 10 may be 3 or 2 mm or less as appropriate.

The permanent magnet member 10 is a thin permanent magnet member having a flatness of 100 or greater, and has a planar form as mentioned above. Here, the flatness is defined by a value obtained when the area of the planar part (area taken as a plane) of the permanent magnet member 10 is divided by the thickness t of the permanent magnet member 10.

Figure 5:
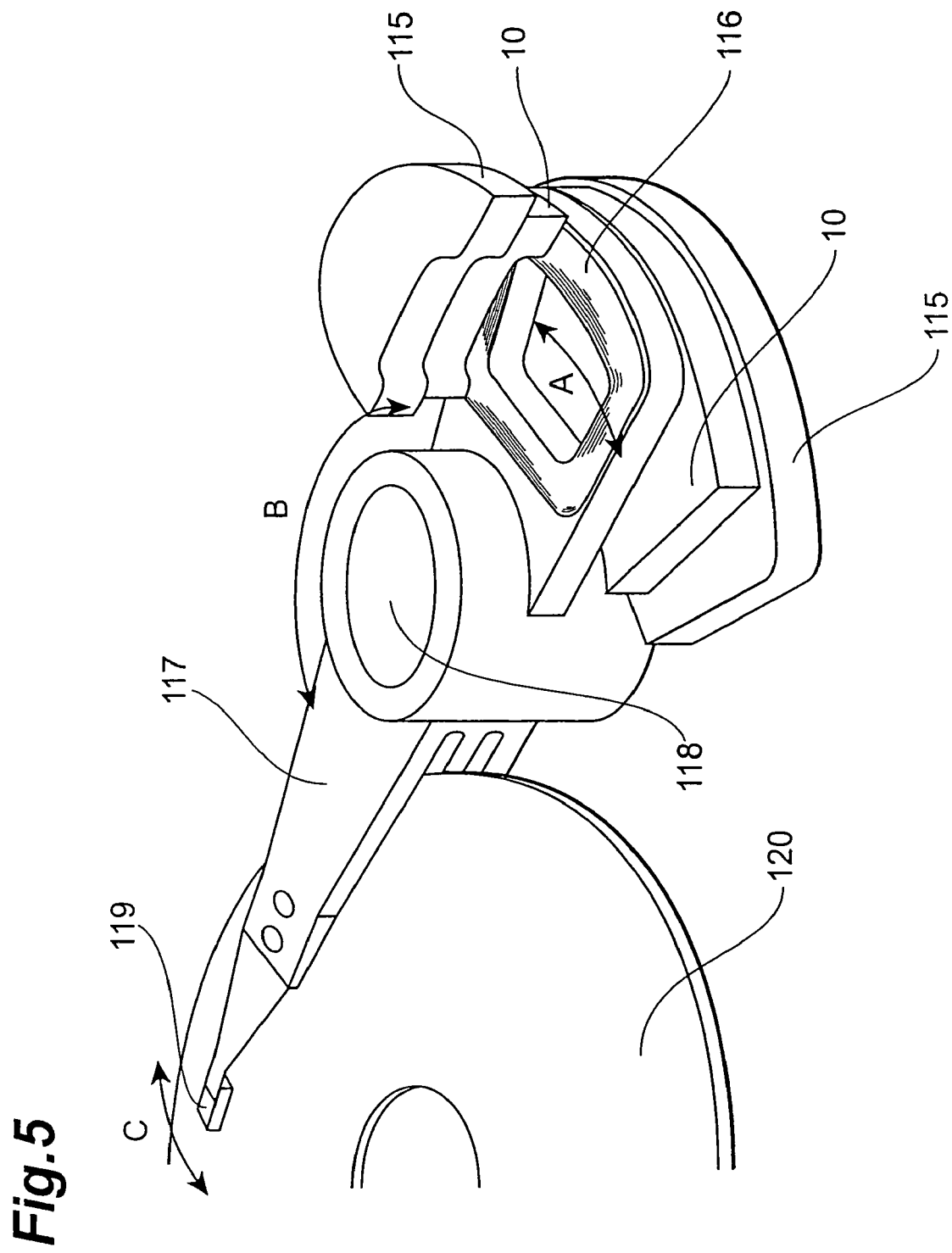
FIG. 5 is a perspective view showing the VCM in accordance with an embodiment.
Figure 6:
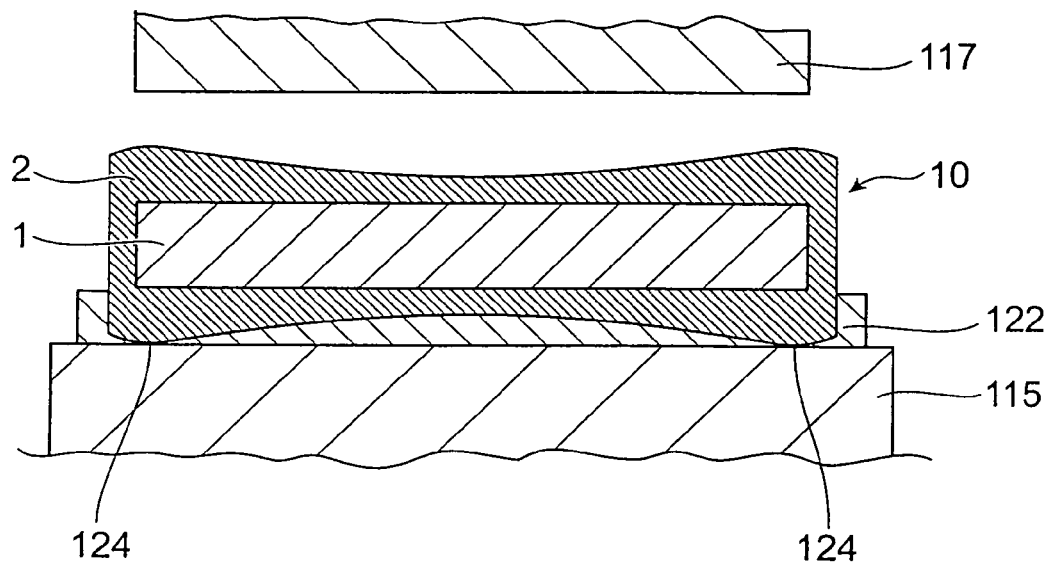
FIG. 6 is a view schematically showing the cross-sectional structure at the bonding part between the permanent magnet member for a VCM and a yoke in the VCM shown in FIG. 5.

Here, the VCM in accordance with an embodiment will be explained with reference to FIGS. 5 and 6. FIG. 5 is a perspective view showing the VCM in accordance with this embodiment. FIG. 6 is a view schematically showing the cross-sectional structure at the bonding part between the permanent magnet member 10 and a yoke 115.

This VCM 100 comprises a pair of yokes 115, a pair of permanent magnet members 10 disposed between the pair of yokes 115 and bonded to the respective yokes 115, and a head carriage 117 (rotatable member) disposed so as to be rotatable about a shaft 118 and mounted with a coil 116 positioned between the pair of permanent magnet members 10. The coil 116 in the head carriage 117 is disposed within a magnetic space formed by the yokes 115 and the permanent magnet members 10. Each permanent magnet member 10 is in contact with its corresponding yoke 115 by a bonding surface 124.

In the VCM 100, each permanent magnet member 10 is bonded to its corresponding yoke 115 by way of an adhesive layer 122 (see FIG. 6). A magnetic head 119 for recording/reading data onto/from a disk 120 is disposed at an end part of the head carriage 117 opposite from the coil 116.

Figure 7:
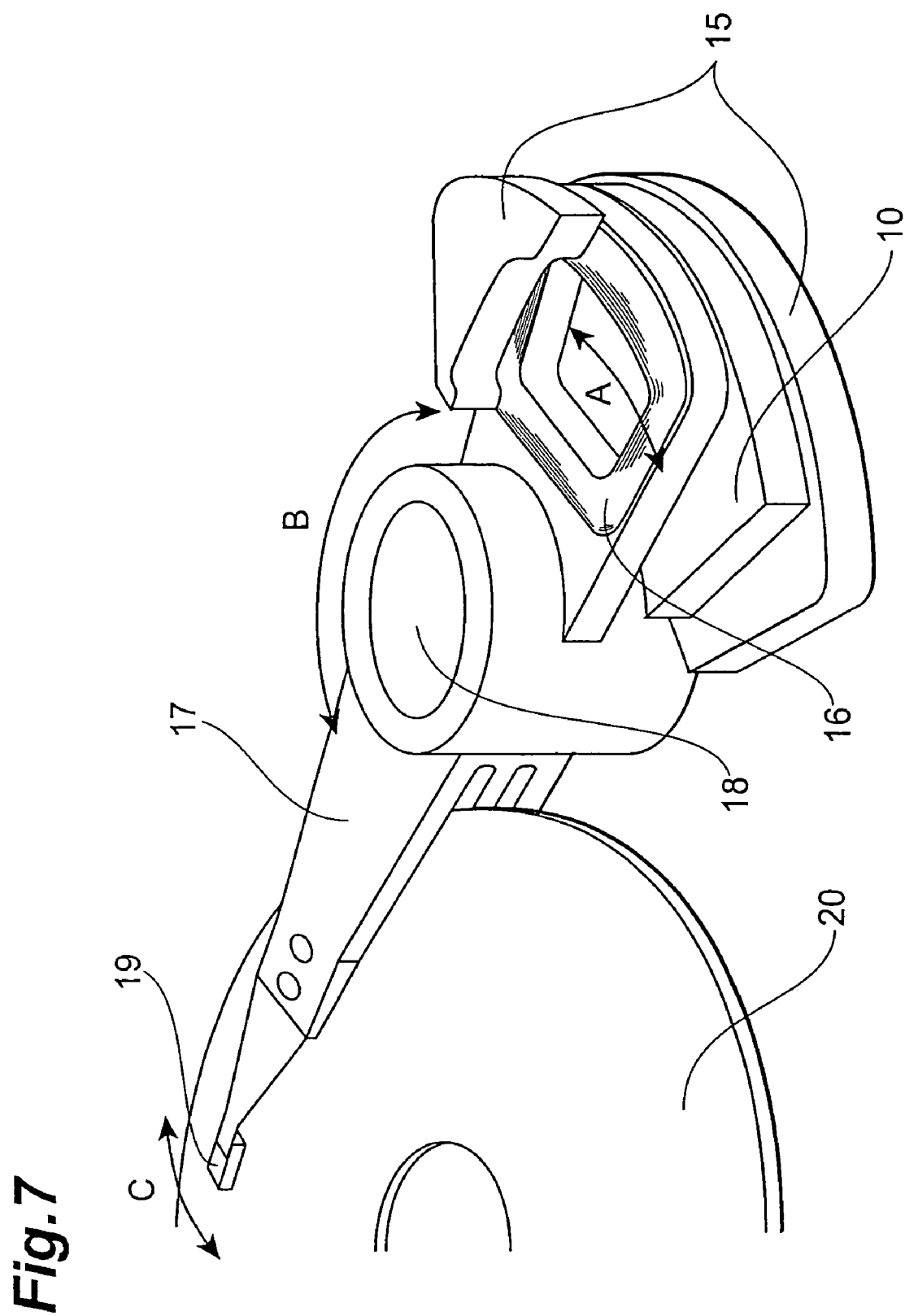
FIG. 7 is a perspective view showing a conventional VCM.

The VCM 100 operates as with the one explained above with reference to FIG. 7. Namely, when a predetermined current flows through the coil 116, a driving force occurs in any of directions of arrows A in the coil 116, whereby the head carriage 117 rotates about the shaft 118 in any of directions of arrows B. Because of such an action of the VCM, the magnetic head 119 mounted to the leading end part of the head carriage 117 moves in any of directions of arrows C. As a consequence, the magnetic head 119 can be positioned with respect to a magnetic disk 120.

Referring to FIGS. 1 to 4 again, the permanent magnet member 10 will now be explained. The thickness t of the permanent magnet member 10 is not uniform but has maximum and minimum values. As mentioned above, the permanent magnet member 10 is bonded and secured to the yoke 115 by way of the adhesive layer 122 in the VCM 100.

The inventors conducted detailed studies and have found that the permanent magnet member 10 can attain a high bonding strength to the yoke 115 when the difference (tmax−tmin) in thickness t between the maximum value (tmax) and the minimum value (tmin) falls within the range of 10 to 150 μm. This seems to be based on the following reason.

Since the permanent magnet member 10 for a VCM has such maximum and minimum values of the thickness t, at least one of the upper face 32 and bottom face 33 is formed with a recess 36 depressed toward the other face. Hence, a space based on the recess 36 is formed at the bonding part between the permanent magnet member 10 and the yoke 115. Since they are bonded by way of the adhesive layer 122, the adhesive constituting the adhesive layer 122 is held within this space. The high bonding strength mentioned above seems to be exhibited as a result of the adhesive held in such a space.

When the value of tmax−tmin is less than 10 μm, the bonding strength is less likely to improve sufficiently. When tmax−tmin exceeds 150 μm, by contrast, the amount of adhesive held in the space increases so much that it takes a longer time to dry and solidify the adhesive, whereby the bonding strength tends to become insufficient. Therefore, the value of tmax−tmin is set to 10 to 150 μm in the permanent magnet member 10. This value is preferably 30 to 100 μm, more preferably 40 to 70 μm.

More preferably, the maximum and minimum values of the thickness t in the permanent magnet member 10 are set such that the peripheral part 30 of the permanent magnet member 10 is thicker than other parts. When the thickness of the peripheral part 30 is made greater as such, each of the upper face 32 and bottom face 33 of the permanent magnet member 10 has a crater-like recess 36, which can effectively hold the adhesive.

The difference between the maximum and minimum values is 10 to 150 μm, since it is set with reference to the thickness of the permanent magnet body 10. However, the difference is not always required to be based on such a reference from the viewpoint of effectively forming the recess 36 mentioned above.

When the peripheral part 30 projects from other areas as mentioned above, for example, the adhesive can favorably be held in the space formed in an area 126 surrounded by the peripheral part 30. In this case, it will be sufficient if the amount of projection of the tmax part from the tmin part (i.e., the amount of projection of the peripheral part 30 from other areas) is ½ of the tmax−tmin value. Namely, it will be sufficient if the peripheral part 30 in the bonding surface 124 of the permanent magnet member 10 to the yoke 115 projects by 5 to 75 μm from other areas. Employable as a value indicating such an amount of projection is the distance t3 between the deepest part and tangent plane P of the recess 36 formed in the upper face 32 or bottom face 33 because of the projection of the peripheral part 30.

The following three techniques can be mentioned as those used in order for the tmax−tmin in the permanent magnet member 10 to attain a value of 10 to 150 μm. The first technique makes the thickness t1 of the magnet body 1 uniform, while changing the thickness t2 of the Ni plating film 2. The second technique changes both the thickness t1 of the magnet body 1 and the thickness t2 of the Ni plating film 2. The third technique changes the thickness t1 of the magnet body 1, while making the thickness t2 of the Ni plating film 2 uniform.

The above-mentioned techniques will now be explained. In each of the techniques explained in the following, the upper face 32 or bottom face 33 of the permanent magnet member 10 is formed with a crater-like recess 36.

The first technique will now be explained. FIG. 2 is a view showing a first mode of the cross-sectional structure of the permanent magnet member taken along the line A-A of FIG. 1, and illustrates the permanent magnet member 10 employing the first technique.

As shown in FIG. 2, the thickness t1 of the magnet body 1 is uniform in the permanent magnet member 10 employing the first technique. On the other hand, the thickness t2 of the Ni plating film 2 is greater in regions extending along the shorter periphery 11 and longer periphery 12. Therefore, the thickness t of the permanent magnet member 10 attains the maximum value in the regions extending along the shorter periphery 11 and longer periphery 12. This thickness t attains the minimum value at a center part c of the permanent magnet member 10, which is located between the shorter periphery 11 and longer periphery 12.

A method of forming the Ni plating film 2 in the first technique will now be explained. The Ni plating film 2 can be formed by electroplating. At the time of electroplating, electric fields are applied to the peripheral part 30 in the permanent magnet member 10 from a plurality of directions. Therefore, the current density becomes higher in this part. On the other hand, electric fields are applied to the upper face 32 and bottom face 33 from vertical directions alone, whereby the current density becomes lower there than in the above-mentioned part.

Utilizing such a difference in current density can make the thickness t2 greater in the region extending along the shorter periphery 11 than in the center part c as shown in FIG. 2. In the peripheral part 30, the current density is higher in the regions circled with dash-single-dot lines in FIG. 1, i.e., the intersection between the shorter periphery 11 and side periphery 13, the intersection between the shorter periphery 11 and side periphery 14, the intersection between the longer periphery 12 and side periphery 13, and the intersection between the longer periphery 12 and side periphery 14, whereby the thickness t2 of the Ni plating film 2 is likely to become greater in these regions.

Among these regions, the current density is higher in the intersection between the longer periphery 12 and side periphery 13 and the intersection between the longer periphery 12 and side periphery 14, each yielding an acute angle of intersection, whereby the thickness t2 of the Ni plating film 2 is likely to attain the maximum value there.

The second technique will now be explained. FIG. 3 is a view showing a second mode of the cross-sectional structure of the permanent magnet member taken along the line A-A of FIG. 1, and illustrates the permanent magnet member 10 employing the second technique.

In the permanent magnet member 10 employing the second technique, as shown in FIG. 3, both the thickness t1 of the magnet body 1 and the thickness t2 of the Ni plating film 2 fluctuate. Namely, the thickness t1 of the magnet body 1 is smaller in the region near the peripheral part 30 (the shorter periphery 11 and longer periphery 12 in FIG. 3). On the other hand, the thickness t2 of the Ni plating film 2 is greater in regions extending along the shorter periphery 11 and longer periphery 12.

In the regions extending along the shorter periphery 11 and longer periphery 12, the thickness t2 of the Ni plating film 2 is set greater than the thickness by which the magnet body 1 is thinned in the peripheral part 30. Hence, the permanent magnet member 10 for a VCM is thicker in the peripheral part 30, whereby each of the upper face 32 and bottom face 33 is formed with a crater-like recess 36.

Thus, the thickness t attains the maximum value in the peripheral part 30 and the minimum value in the center part c existing between the shorter periphery 11 and longer periphery 12 also in the permanent magnet member 10 employing the second technique.

The shape of the magnet body 1 and Ni plating film 2 in the second technique mentioned above can be formed in the following manner. Employable as methods of reducing the thickness t of the magnet body 1 in the region near the peripheral part 30 include those subjecting the magnet body 1 to barrel polishing, etching with an acid before forming the Ni plating film 2, and the like.

In each of these methods, conditions are set appropriately so as to thin the region near the peripheral part 30. For etching, for example, the time for etching may be adjusted, etc. When reducing the thickness t1 of the magnet body 1 in the region near the peripheral part 30 as such, it will be preferred if this region is made thinner than other regions by about 20 to 100 μm. The Ni plating film 2 can be formed as in the first technique.

The third technique will now be explained. FIG. 4 is a view showing a third mode of the cross-sectional structure of the permanent magnet member taken along the line A-A of FIG. 1, and illustrates the permanent magnet member 10 employing the third technique.

As shown in FIG. 4, the thickness t2 of the Ni plating film 2 is uniform in the permanent magnet member 10 employing the third technique. On the other hand, the magnet body 1 is thicker in regions extending along the shorter periphery 11 and longer periphery 12. Therefore, the thickness t attains the maximum value in the peripheral part 30 and the minimum value in the center part c located between the shorter periphery 11 and longer periphery 12 in this permanent magnet member 10 as well.

For making the thickness t2 uniform in the Ni plating film 2 as such, it will be sufficient if the current density is held low at the time of electroplating. The magnet body 1 having the shape mentioned above can be formed by barrel polishing or etching under a condition where the thickness t1 becomes smaller in the region near the center part c thereof.

Examples of the permanent magnet member for a VCM in accordance with preferred embodiments include those in the modes mentioned above. In the permanent magnet member 10 in accordance with any of the embodiments, it will be preferred if the thickness t2 of the Ni plating film 2 is 5 to 60 μm.

If the thickness of the Ni plating film 2 is less than 5 μm, pinholes are likely to be formed in the Ni plating film 2 even when the magnet body 1 is mirror-polished. When such a pinhole is formed in the Ni plating film 2, the corrosion of the magnet body 1 may proceed from this part. When t2 is large, on the other hand, the volume of the magnet body in the permanent magnet member 10 becomes relatively smaller, whereby magnetic characteristics of the permanent magnet member 10 tend to deteriorate. For avoiding such inconveniences, t2 is preferably 60 μm or less.

From the viewpoint of attaining sufficient corrosion-resistant and magnetic characteristics, the thickness t2 of the Ni plating film 2 is more preferably 10 to 30 μm. As mentioned above, the thickness t2 is not constant but often fluctuates in the permanent magnet member 10. Even when the thickness t2 fluctuates as such, it is preferred that t2 fall within the thickness range mentioned above in all the regions. For such an Ni plating film 2, rack plating or barrel plating is selected as appropriate.

As the Ni plating film to be formed in the permanent magnet member 10, various kinds of Ni plating films can be applied without greatly changing the adhesion. Hence, for improving the bonding strength between the magnet body 1 and the Ni plating film 2, an undercoat layer (not depicted) which can reduce the stress exerted on the interface between the magnet body 1 and Ni plating film 2 may be provided therebetween. Preferably, the undercoat layer contains Cu as a main ingredient.

When an excess load is exerted on the bonded permanent magnet member 10 for a VCM, a soft undercoat layer made of Cu, for example, can restrain the stress generated between the magnet body 1 and the Ni plating film 2 from concentrating at one location. This enhances the bonding strength between the magnet body 1 and the Ni plating film 2. Though not restricted in particular, the thickness of such an undercoat layer is preferably 5 to 10 μm. In the permanent magnet member for a VCM in the present invention, such an undercoat layer is included in the concept of the corrosion-resistant film.

The magnet body 1 in the permanent magnet member 10 will now be explained.

The magnet body 1 in accordance with an embodiment is an R-TM-B type rare-earth magnet containing R (where R is at least one kind of rare-earth element including Y), TM (where TM is at least one kind of transition metal including Fe or Fe and Co as an essential ingredient), and B.

Preferred as the rare-earth element R is one containing at least one kind selected from Nd, Pr, Ho, and Tb, or one containing at least one kind selected from La, Sm, Ce, Gd, Er, Eu, Pm, Tm, Yb, and Y in addition thereto. When two or more kinds of elements are contained as R, a mixture such as misch metal can also be used as a material therefor.

Preferably, in the magnet body 1, the R content is 5.5 to 30 atom %. If the R content is too small, i.e., less than 5.5 atom %, the crystal structure of the magnet becomes a cubic system substantially identical to that of α iron, thereby being harder to attain a high coercive force (the coercive force being referred to as "iHc" in the following). If the R content is too large, i.e., more than 30 atom %, R-rich nonmagnetic phases increase too much, whereby the residual magnetic flux density (which will hereinafter be referred to as "Br") tends to decrease.

The TM content is preferably 42 to 90 atom %. If the TM content is too small (less than 42 atom %), Br tends to decrease. If the TM content is too much (more than 90 atom %), iHc tends to decrease. As TM, Co may be contained in addition to Fe. This can improve temperature characteristics without lowering magnetic characteristics. Preferably, in this case, the amount of Co substituting Fe is 50% or less. If the amount of substitution by Co exceeds 50%, magnetic characteristics may deteriorate.

The B content is preferably 2 to 28 atom %. If the B content is too small (less than 2 atom %), the crystal structure of the magnet becomes a rhombohedral structure, whereby iHc tends to become insufficient. If the B content is too much (more than 28 atom %), B-rich nonmagnetic phases increase too much, whereby Br tends to decrease.

The R-TM-B type rare-earth magnet constituting the magnet body 1 may contain Ni, Si, Al, Cu, Ca, and the like as inevitable impurities by an amount of 3 atom % or less of the total in addition to the above-mentioned R, TM, and B.

B may be partly substituted by at least one kind of element selected from C, P, S, and Cu. This makes it easier to manufacture the magnet body, thereby improving the productivity and lowering the manufacturing cost. Preferably, in this case, the amount of substitution is 4 atom % or less of the total. From the viewpoints of increasing iHc, improving the productivity, lowering the manufacturing cost, etc., at least one kind of element such as Al, Ti, V, Cr, Mn, Bi, Nb, Ta, Mo, W, Sb, Ge, Sn, Zr, Ni, Si, and Hf may be added. Their amount of addition is preferably within a range not affecting magnetic characteristics, 10 atom % or less of the total amount of constitutional atoms in particular.

The magnet body 1 having the above-mentioned configuration comprises a main phase substantially in a cubic crystal structure. Preferably, the main phase has a particle size on the order of 1 to 100 μm. The magnet body 1 contains 1 to 50% by volume of nonmagnetic phases.

A method of making the permanent magnet member 10 for a VCM in accordance with a preferred embodiment will now be explained.

In the making of the permanent magnet member 10, the magnet body 1 is manufactured at first. The magnet body 1 is favorably made by powder metallurgy. The making of the magnet body 1 by powder metallurgy can be carried out in the following manner.

First, an alloy having a desirable composition is prepared by a known alloy making process such as casting and strip casting. Subsequently, thus obtained alloy is roughly pulverized by a rough pulverizer such as jaw crusher, Brown mill, and stamp mill so as to attain a particle size of 10 to 100 μm, and then is finely pulverized by a fine pulverizer such as jet mill and attritor so as to yield a particle size of 0.5 to 5 μm.

Thus obtained powder is molded preferably with a pressure applied thereon in a magnetic field. Preferably, the magnetic field strength at the time of molding is 955 to 1353 kA/m (12.0 to 17.0 kOe). The molding pressure is preferably on the order of 0.5 to 5 tons/cm$^2$. Subsequently, thus molded product is sintered for 0.5 to 10 hours at a temperature of 1000° C. to 1200° C. and then is cooled rapidly, so as to yield a sintered body. Preferably, the atmosphere at the time of sintering is an inert gas such as Ar gas.

Thus sintered product is subjected to heat treatment (aging treatment) for 1 to 5 hours at a temperature of 500° C. to 900° C. preferably in an inert gas atmosphere, so as to yield the magnet body 1. The aging treatment may be carried out in two stages as well. When the aging treatment is carried out in two stages, it will be effective if the sintered product is held for predetermined periods of time in the vicinity of 800° C. and 600° C., respectively. When heat treatment is carried out in the vicinity of 800° C. after the sintering, the coercive force of the magnet body 1 tends to increase in particular, which is specifically effective in the mixing method. Since the coercive force tends to be enhanced greatly by the heat treatment in the vicinity of 600° C., it is preferred that the aging treatment be carried out in the vicinity of 600° C. in the case of a single stage. Thus obtained magnet body 1 exhibits excellent magnetic characteristics in particular when R is Nd. However, the magnet body 1 is known to yield a negative coefficient of expansion in the direction perpendicular to the C axis.

After the magnet body 1 is formed as such, its surface is preferably subjected to a predetermined process before forming the Ni plating film 2. Specifically, after being degreased, the surface of the magnet body 1 is chemically etched with an acid and is subjected to pretreatment for cleaning. The pretreatment is an arbitrary process, which is not always necessary. However, this pretreatment can eliminate dirt from the surface of the magnet body 1, whereby the Ni plating film 2 can be formed favorably. The magnet body 1 may be subjected to barrel polishing for removing burrs and the like from the surface before the degreasing.

Any degreasing solution usually employed for steel and the like can be used without any restrictions in particular. Employable as such a degreasing solution in general is one containing NaOH as a main ingredient and, if necessary, additives.

Preferably, nitric acid is used as an acid in the chemical etching. When typical steel materials are subjected to plating, nonoxidizing acids such as hydrochloric acid and sulfuric acid are often used in the chemical etching for pretreatment. When one containing a rare-earth element, such as the magnet body 1, is treated with these nonoxidizing acids, however, hydrogen generated by the acids may be occluded in the surface of the magnet body 1. This may weaken the site of occlusion, thereby generating a large amount of powdery undissolved matters. Such powdery undissolved matter remains on the surface of the magnet body 1 even after surface treatment and leading this surface rough, thereby causing defects and poor adhesion in the Ni plating film 2 formed on the surface. It is therefore desirable that the etching solution for the magnet body 1 containing a rare-earth element contain no nonoxidizing acids mentioned above.

Therefore, it is preferred that nitric acid, which is an oxidizing acid less likely to generate hydrogen, be used for chemically etching the magnet body 1. Preferably, the chemical etching solution contains aldonic acid or a salt thereof in addition to nitric acid. Aldonic acid or a salt thereof acts to form minute irregularities which cannot be seen with eyes on the surface of the magnet body 1. When the magnet body 1 is formed with a number of such irregularities, the permanent magnet member 10 attains similar irregularities on the surface thereof after forming the Ni plating film 2.

The permanent magnet member 10 having such irregularities on the surface exhibits quite excellent adhesion with respect to the adhesive layer 122. As a result, the bonding between the permanent magnet member 10 and the yoke 115 is further improved. Such an action of forming minute irregularities on the surface of the magnet body 1 is specific to aldonic acid and its salts and cannot be achieved by other organic acids such as citric acid and tartaric acid, for example.

The amount of dissolution of the surface of the magnet body 1 by the pretreatment is such that the magnet body is eliminated from the surface preferably by at least 5 μm, more preferably by 10 to 15 μm. If the amount of dissolution is too small, the altered layer or oxidized layer formed by processing the surface of the magnet body 1 may not be eliminated sufficiently, thus making it harder to form the Ni plating film 2 favorably thereon. This may remarkably deteriorate the corrosion-resistant characteristic of the permanent magnet member 10.

The nitric acid concentration in the processing solution used for the pretreatment is preferably 1 normal or less, more preferably 0.5 normal or less. If the nitric acid concentration is too high (more than 1 normal), the dissolving rate of the magnet body 1 may become too high, thereby making it harder to regulate the amount of dissolution. When carrying out mass-processing such as barrel processing in this case, the amount of dissolution fluctuates greatly among individual magnet bodies, whereby dimensional accuracy is harder to keep in the product. If the nitric acid concentration is too low, on the other hand, the amount of dissolution tends to become insufficient. Therefore, the nitric acid concentration is preferably 1 normal or less, more preferably 0.5 to 0.05 normal. The amount of Fe dissolved in the processing solution at the time when the treatment is completed is set to about 1 to 10 g/L.

Preferably, after the pretreatment, the magnet body 1 is further washed with ultrasonic waves. Such ultrasonic washing can substantially completely eliminate the small amount of undissolved matters and residual acid components remaining in the magnet body 1. Preferably, such ultrasonic washing is carried out with ion-exchanged water whose amount of chlorine ions, which may generate rust on the surface of the magnet body 1, is very small. If necessary, washing with similar ion-exchanged water may be carried out before and after the ultrasonic washing and before and after the pretreatment.

Thereafter, by electroplating, the Ni plating film 2 is formed on the surface of the pretreated magnet body 1. Such electroplating can form the Ni plating film 2, which is a high-performance corrosion-resistant film, at a low cost. Examples of the plating bath used for the electroplating include Watt's bath containing no chlorinated Ni, sulfamic acid bath, borofluoric bath, and brominated Ni bath.

The permanent magnet member for a VCM and the VCM equipped therewith in accordance with the present invention are not limited to the above-mentioned embodiments, and can be modified in various manners within the scope not deviating from the gist thereof. For example, though the VCM 100 in accordance with the above-mentioned embodiment is one in which the respective permanent magnet members 10 are bonded to a pair of yokes 115, a single permanent magnet member 10 may be bonded to one of the yokes 115 alone as in the VCM shown in FIG. 7. From the viewpoint of effectively reducing the vibration generated from the VCM, it is preferred that the permanent magnet members 10 be bonded to both of the yokes 115.

EXAMPLES

In the following, the present invention will be explained in further detail with reference to examples, which do not restrict the present invention.

(Making of Permanent Magnet Member for VCM)

First, an alloy ingot having a composition constituted by 13.8 atom % of Nd, 1.2 atom % of Dy, 77.1 atom % of Fe, 1.1 atom % of Co, and 6.8 atom % of B was obtained. This ingot was subjected to hydrogen pulverization, in which hydrogen was occluded therein at room temperature and then dehydrogenation was effected for 1 hour at 600° C. in an Ar atmosphere. Subsequently, the hydrogen-pulverized alloy was roughly pulverized with a jaw crusher, and then finely pulverized with a jet mill, whereby fine powder having an average particle size of 3.5 μm was obtained.

Thus obtained fine particle was molded at a pressure of 1.2 tons/cm$^2$ in a magnetic field of 1194 kA/m (15 kOe), whereby a molded product was obtained. Subsequently, the molded product was sintered for 2 hours at 1100° C., so as to yield a sintered magnet. Then, the sintered magnet was subjected to two stages of aging treatment, i.e., 1 hour at 800° C. and 2.5 hours at 550° C. (both in an Ar atmosphere).

Thereafter, the sintered magnet was cut into the form shown in FIG. 1, whereby the magnet body 1 was obtained. When cutting the magnet body 1, four kinds of magnet bodies with different thicknesses were cut out while the planar part area (area of the magnet body 1 taken as a plane) was held at 280 mm$^2$. Specifically, as shown in Table 1, their thicknesses were 1.370 mm (No. 1), 1.460 mm (No. 2), 1.410 mm (No. 3), and 1.300 mm (No. 5). Each of these magnet bodies 1 exhibited a flatness of 100 or greater.

In parallel with the above, the cut magnet body 1 was subjected to barrel polishing and then etching, whereby a magnet body 1 (No. 4) having a magnet center part with a thickness of 1.470 mm and acute angle end parts with a thickness of 1.300 mm was obtained. These magnet bodies 1 were subjected to barrel polishing, so that their peripheral parts were chamfered to R=0.5 mm, and then were immersed in an alkaline degreasing solution. Thereafter, they were etched for 10 minutes with a 3% aqueous nitric acid solution at 30° C.

Thus obtained samples Nos. 1 to 5 of magnet bodies 1 were subsequently subjected to barrel polishing, degreasing, and etching, and then was electroplated with Ni by a barrel method using a Watt's bath, whereby the Ni plating film 2 was formed on the surface of each magnet body 1. As a consequence, samples Nos. 1 to 5 of permanent magnet members 10 for VCMs (VCM magnets) corresponding to the samples Nos. 1 to 5 of magnet bodies 1 were obtained.

The thicknesses t2 in the center part (region indicated by c in FIGS. 2 to 4 and 8) and acute angle end parts (the intersections between the longer periphery 12 and side periphery 13 and between the longer periphery 12 and side periphery 14) of the Ni plating films 2 formed on the respective magnet bodies 1 were as shown in Table 1. The Ni plating films 2 for the respective permanent magnet members 10 were formed while the current density and plating time were set as shown in Table 2.

(Measurement of Thickness and Magnetic Flux of Permanent Magnet Member for VCM)

The thickness (thickness t1 of the magnet body+thickness t2 of Ni plating film 2) was measured in the center part and acute angle end parts in each of thus obtained samples Nos. 1 to 5 of permanent magnet members 10, and the thickness ratio and the maximum value−minimum value of thickness (max−min in Table 1) were calculated according to these values. Also, the magnetic flux (μWbT) of each permanent magnet member 10 was measured. Table 1 lists these results. Here, the thickness ratio refers to the value calculated as the ratio of the thickness of the magnet body 1 in each of samples Nos. 1 to 4 of permanent magnet members with reference to the thickness of the magnet body 1 in sample No. 5 of permanent magnet member.

These permanent magnet members 10 are restricted in terms of their size, thickness in particular, since they are mounted to a VCM. Therefore, from the viewpoint of securing higher magnetic characteristics, it is important for each permanent magnet member 10 for a VCM to be designed as thick as possible within the range mountable to the VCM.

As shown in Table 1, each of samples Nos. 1 to 4 of permanent magnet members yielded a magnetic flux greater than that of sample No. 5 of the permanent magnet member. This has proved that higher magnetic characteristics are obtained as the thickness t1 of the magnet body 1 is greater when the thickness t of the permanent magnet member 10 is the same. However, the minimum value of thickness in the Ni plating film 2 is preferably 5 μm or greater, since it becomes harder for the permanent magnet member 10 to attain a sufficient corrosion-resistant characteristic if the Ni plating film 2 is too thin. Since the permanent magnet member 10 having the Ni plating film 2 with a thickness of 15 μm exhibited an excellent corrosion-resistant characteristic as in this example, the thickness of the Ni plating film 2 is preferably at least 15 μm.

(Evaluation of Bonding Strength)

Using samples Nos. 1 to 5 of permanent magnet members 10, bonding tests were carried out, so as to evaluate the bonding strength to a yoke 115 which was a rotating member of a VCM. First, the permanent magnet members 10 were bonded to the respective yokes 115 with an anaerobic acrylic adhesive (Loctite 638UV manufactured by Loctite Japan Co., Ltd.), so as to yield bonded products.

As the yoke 115, one comprising a body formed from a silicon steel plate and electroless Ni plating applied to the surface thereof was employed. The bonding was effected by

TABLE 1

| | Magnet body thickness (mm) | | Plating thickness (μm) | | VCM magnet | | | | | |
|---|---|---|---|---|---|---|---|---|---|---|
| No | Center part | Acute angle end | Center part | Acute angle end | Thickness in Center part (mm) | Thickness in Acute angle end (mm) | Thickness ratio | max−min (μm) | Magnetic flux (μWbT) | Shear strength (kgf/cm²) |
| 1 | | 1.370 | 15 | 15 | 1.400 | 1.500 | 1.054 | 100 | 382 | 63 |
| 2 | | 1.460 | 15 | 15 | 1.500 | | 1.123 | 0 | 409 | 61 |
| 3 | | 1.410 | 15 | 35 | 1.440 | | 1.085 | 60 | 393 | 65 |
| 4 | 1.470 | 1.300 | 15 | 100 | 1.500 | | 1.130 | 0 | 404 | 60 |
| 5 | | 1.300 | 15 | 100 | 1.330 | | 1.000 | 170 | 362 | 45 |

TABLE 2

| No | Average cathode current density (A/dm²) | Plating time (h) |
|---|---|---|
| 1 | 0.03 | 50 |
| 2 | 0.03 | 50 |
| 3 | 0.1 | 1.7 |
| 4 | 0.3 | 5 |
| 5 | 0.3 | 5 |

In each of thus obtained permanent magnet members 10, the peripheral part 30 projected from the area surrounded by the peripheral part 30. Also, as shown in Table 1, the thickness attained the maximum value (max) of 1.500 mm at the acute angle end parts, and the minimum value (mm) at the center part c (see FIGS. 2 to 4 and 8).

coating a planar part (upper face 32 or bottom face 33) of the permanent magnet member 10 with 0.008 to 0.010 g of the adhesive, pressing this surface against the yoke 115, and holding the resulting bonded product for 30 minutes in a dryer whose temperature had been raised to 100° C. beforehand.

The bonded products comprising the respective permanent magnet members were subjected to a compression shear test at a rate of 5 mm/min at room temperature, so as to measure the shear strength (kgf/cm²) of each bonded product. Table 1 lists thus obtained results.

From Table 1, the shear strength was seen to vary depending on the maximum value−minimum value (max−min in Table 1) in thickness of the permanent magnet member 10. Specifically, the shear strength improved as the maximum value−minimum value in thickness of the permanent magnet member 10 increased from 0 μm (Nos. 2 and 4) to 60 μm (No. 3) and 100 μm (No. 1). This indicates that a greater bonding strength is obtained in the case where the bonding surface has a space capable of holding the adhesive than in the case where completely flat surfaces are bonded together.

When the maximum value–minimum value was further increased to 170 μm (No. 5), however, the shear strength decreased on the contrary. This seems to be because the space for holding the adhesive is so large that the adhesive is applied to the magnet body 1 in excess, whereby the organic solvent contained in the adhesive is harder to evaporate. It is presumed that, as a result, the adhesive fails to solidify sufficiently, thereby lowering the bonding strength (shear strength).

INDUSTRIAL APPLICABILITY

Thus, the present invention can provide a permanent magnet member for use in a voice coil motor (VCM), which improves the adhesion to yokes. The present invention can also provide a VCM equipped with such a permanent magnet member for a VCM, which can be driven at a higher speed.

The invention claimed is:

1. A permanent magnet member for a voice coil motor, the permanent magnet member comprising:
   a magnet body including a shorter periphery, a longer periphery located at a position separated from the shorter periphery by a predetermined distance, and a pair of side peripheries connecting the shorter and longer peripheries to each other, the magnet body having a fan-shaped planar form; and
   a corrosion-resistant film applied to a surface of the magnet body;
   wherein the permanent magnet member has a thickness whose maximum and minimum values yield a difference of 10 to 150 μm therebetween, and
   the corrosion-resistant film has a thickness whose maximum value exists along a peripheral part constituted by the shorter periphery, longer periphery, and side peripheries, and whose minimum value exists in an area surrounded by the peripheral part.

2. A permanent magnet member for a voice coil motor according to claim 1, wherein the maximum value of the thickness exists along a peripheral part comprising the shorter periphery, longer periphery, and side peripheries; and wherein the minimum value of the thickness exists in an area surrounded by the peripheral part.

3. A permanent magnet member for a voice coil motor according to claim 2, wherein the corrosion-resistant film has a thickness greater in the peripheral part than in other areas.

4. A permanent magnet member for a voice coil motor according to claim 3, wherein the magnet body has a substantially uniform thickness or a thickness smaller in the peripheral part than in other areas.

5. A permanent magnet member for a voice coil motor according to claim 2, wherein the magnet body has a thickness greater in the peripheral part than in the other areas; and wherein the corrosion-resistant film has a substantially uniform thickness.

6. A permanent magnet member for a voice coil motor according to claim 1, wherein the permanent magnet member for the voice coil motor has a thickness of 5 mm or less;
   wherein the corrosion-resistant film is constituted by an electroplating film made of Ni or an Ni alloy; and
   wherein the corrosion-resistant film has a thickness falling within the range of 5 to 60 μm.

7. A voice coil motor comprising:
   a pair of yokes disposed so as to oppose each other with a predetermined distance therebetween;
   a permanent magnet member according to claim 1 disposed between the pair of yokes and bonded to each of the yokes by way of an adhesive layer; and
   a coil mounted to a rotatable member and disposed in a magnetic space formed by the permanent magnet member and the yoke, the rotatable member being rotatable about a predetermined axis;
   wherein a bonding surface of the permanent magnet member to the yoke has a peripheral part projecting by 5 to 75 μm from an area surrounded by the peripheral part.

* * * * *